US006281298B1

(12) United States Patent
Papsin, Jr.

(10) Patent No.: US 6,281,298 B1
(45) Date of Patent: Aug. 28, 2001

(54) WATER-BASED PRESSURE SENSITIVE ADHESIVES HAVING ENHANCED CHARACTERISTICS

(75) Inventor: George A. Papsin, Jr., Lino Lakes, MN (US)

(73) Assignee: H. B. Fuller Licensing & Financing Inc., St. Paul, MN (US)

( * ) Notice: Subject to any disclaimer, the term of this patent is extended or adjusted under 35 U.S.C. 154(b) by 0 days.

(21) Appl. No.: 09/378,581

(22) Filed: Aug. 20, 1999

(51) Int. Cl.[7] .......................... C09J 133/08; C09J 133/00
(52) U.S. Cl. ...................... 525/419; 525/221; 525/309; 525/412; 525/414; 525/421; 524/272; 524/314; 524/501; 524/507; 524/512
(58) Field of Search ..................... 525/419, 421, 525/412, 414, 221, 309; 524/501, 507, 512, 272, 314

(56) References Cited

U.S. PATENT DOCUMENTS

| | | | |
|---|---|---|---|
| Re. 24,906 | * 12/1960 | Ulrich | 206/59 |
| 2,884,126 | * 4/1959 | Ulrich | 206/59 |
| 3,299,010 | 1/1967 | Samour et al. | 260/78 |
| 3,400,103 | * 9/1968 | Samour et al. | 260/78 |
| 3,734,819 | 5/1973 | Knutson | 428/463 |
| 3,740,366 | * 6/1973 | Thomas et al. | 260/29.6 M |
| 4,049,847 | 9/1977 | Eisentraeger et al. | 427/207 B |
| 4,077,926 | 3/1978 | Sanderson et al. | 526/312 |
| 4,128,518 | * 12/1978 | Oyamada et al. | 260/29.6 E |
| 4,185,050 | * 1/1980 | Lazear et al. | 525/221 |
| 4,234,500 | 11/1980 | Hoeschele et al. | 424/287 |
| 4,322,516 | * 3/1982 | Wiest et al. | 526/307.7 |
| 4,668,730 | 5/1987 | Iovine et al. | 524/460 |
| 4,726,982 | 2/1988 | Traynor et al. | 428/213 |
| 4,888,395 | * 12/1989 | Min | 525/301 |
| 5,059,264 | 10/1991 | Sheets | 156/62.2 |
| 5,075,360 | 12/1991 | Fitt et al. | 524/48 |
| 5,187,210 | 2/1993 | Fitt et al. | 524/52 |
| 5,354,807 | * 10/1994 | Dochniak | 524/591 |
| 5,692,937 | * 12/1997 | Zhang | 442/149 |
| 5,962,571 | * 10/1999 | Overbeck et al. | 524/460 |
| 5,965,646 | * 10/1999 | Norby | 524/247 |
| 6,048,611 | * 4/2000 | Lu et al. | 428/355 AC |
| 6,066,688 | * 5/2000 | Samonides et al. | 524/272 |
| 6,072,019 | * 6/2000 | Sengupta | 528/59 |
| 6,084,024 | * 7/2000 | Mao et al. | 524/556 |

FOREIGN PATENT DOCUMENTS

| | | |
|---|---|---|
| 1546144 | 5/1979 | (GB) . |
| WO 97/43325 | 11/1997 | (WO) . |
| WO 99/29746 | 6/1999 | (WO) . |

* cited by examiner

Primary Examiner—P. Hampton-Hightower
(74) Attorney, Agent, or Firm—Nancy Quan; Bin Su

(57) ABSTRACT

The present invention relates to water-based pressure sensitive adhesives comprising at least one water-based polymer and at least one aminoplast resins such as melamine-formaldehyde resins, urea-formaldehyde resins, alkylated melamine-formaldehyde resins and combinations thereof. More particularly, the invention relates to water-based pressure sensitive adhesives comprising the reaction product of aqueous polymer dispersions and water dispersible melamine-formaldehyde resins. The pressure sensitive adhesives are characterized as having enhanced bonding characteristics including loop tack, peel strength, and shear strength making them particularly useful for the manufacture of dry-bonded laminates, tapes, labels, medical patches and devices, flexible packages, furnace ducts, exterior insulating finish system and the like.

20 Claims, No Drawings

WATER-BASED PRESSURE SENSITIVE ADHESIVES HAVING ENHANCED CHARACTERISTICS

FIELD OF INVENTION

The present invention relates to water-based pressure sensitive adhesives comprising at least one water-based polymer and at least one aminoplast resin such as melamine formaldehyde resins, urea formaldehyde resins, alkylated melamine formaldehyde resins and combinations thereof. More particularly, the invention relates to water-based pressure sensitive adhesives comprising the reaction product of at least one water-based polymer and water dispersible melamine-formaldehyde resins. Specifically, it relates to water-based pressure sensitive adhesives having enhanced bonding characteristics including tack, peel strength and shear strength.

BACKGROUND OF THE INVENTION

Aminoplast resins have been used in a variety of applications such as in fire retardant compositions, glass fiber thermal insulation, plywood processing, molding composition and decorative lamination. Melamine-formaldehyde resins have been used as a crosslinking agent for the preparation of pressure sensitive adhesives and primers. For example, aqueous polymer dispersions are often used with said resins to enhance bonding characteristics. Several patents describing such adhesives and primers are described below.

Fitts et al., U.S. Pat. Nos. 5,075,360 and 5,187,210 disclose adhesives employed in manufacturing corrugated board. The adhesive composition comprises starch, boron containing compound, a basic agent and optionally, a water resistant additive comprising aminoplast resins such as urea formaldehyde, ketone formaldehyde and melamine formaldehyde.

Sheets et al., U.S. Pat. No. 5,059,264 discloses an aqueous dispersed primer-sealer composition applied to a surface layer of overlay paper or surface mat. The primer-sealer is based on a polymeric binder composition containing melamine resin, carboxyl functional acrylic emulsion copolymer, vinyl-acetate-vinyl versatate copolymer, emulsified fatty acid, and polyvinyl alcohol.

Pressure sensitive adhesives are used in a variety of applications due to their ability to form a bond at room temperature immediately upon contact, merely by the application of light pressure.

Tack, peel and shear are three properties which are useful in characterizing the nature of pressure sensitive adhesives. The tack measures the adhesive's ability to adhere quickly. Peel measures the ability of the adhesive to resist forced delamination. Shear measures the adhesive's ability to hold in position when shearing forces are exerted. Although tack and peel are directly related to each other, they are inversely related to shear.

A major disadvantage of pressure sensitive adhesives is that by chemical nature, they often have an inherently low cohesive strength. In addition, since they are thermoplastic and soften rapidly at a temperature in excess of about 140° F. (60° C.), they are limited to applications where the stress of the bond or assembled joint is low, i.e., generally less than 2 psi in shear.

Hoeschele et al., U.S. Pat. No. 4,234,500 and Traynor et al., U.S. Pat. No. 4,726,982 disclose improving loop tack and peel by formulating pressure sensitive adhesives with a tackifying resin. However, shear resistance could only be improved by sacrificing peel and loop tack in a single polymer composition or by formulating with a high shear product such as an elastomer or natural rubber latex. Thus, maintaining a requsite balance of poperties while improving one adhesive property, may detrimentally affect one or more of the desirable properties of pressure sensitive adhesives.

Sanderson et al., U.S. Pat. No. 4,077,926 disclose pressure sensitive adhesives containing polymerized alkoxyalkyl esters of unsaturated carboxylic acid. While the polymer of the invention is preferably an organic solution or less desirably an aqueous dispersion prepared in those media, it may also be used and/or prepared as a nonaqueous dispersion, a bulk polymerizable, an organic solvent solution of the polymer emulsified in water, and the like. In a preferred embodiment, an organic compound having two or more functional groups capable of reacting with the carboxylic and hydroxyl groups in the polymer is included to crosslink the said carboxylic acid groups. Among the polyfunctional compounds are phenol-formaldehyde, aminoplasts such as melamine-formaldehyde and alkylated melamine-formaldehyde. The amount of crosslinker is preferably from about 1% to about 5%. According to the invention, shear resistance is improved by crosslinking while retaining excellent tack.

A drawback with pressure sensitive adhesives described in the prior art references relates to shear strength. The pressure sensitive adhesives often have high tack, high peel strengh but lack adequate shear strength.

Therefore, there remains a need for water based pressure sensitive adhesives that exhibit excellent tack and peel strength with substantial improvements in shear strength when subjected to increased thermal and/or mechanical stress.

SUMMARY OF THE INVENTION

The present invention relates to a water-based pressure sensitive adhesive comprising:
 a) at least one water-based polymer selected from the group consisting of polyacrylic, polyurethane, polyurethane-acrylic hybrids, polyamides, styrene-butadiene rubber, polychoroprenes, acrylonitrile-butadiene-styrene, polyisoprene, polyisobutylene, polyurea, natural latex, polysaccharides, gum resins and combinations thereof;
 b) at least one aminoplast resin present in an amount ranging from about 0.2% by weight to about 8% by weight based on total solids.

Another aspect of the present invention relates to a water-based pressure sensitive adhesive comprising the reaction product of:
 a) at least one aqueous polyacrylic dispersion present in an amount ranging from about 90% by weight to about 99.8% by weight based on total solids; and
 b) at least one melamine formaldehyde resin present in an amount ranging from about 0.2% by weight to about 8% by weight based on total solids.

Surprisingly, the pressure sensitive adhesives of the present invention have a loop tack greater than about 3 newtons/cm, a peel strength greater than about 5 newtons/cm, and a shear strength greater than about 10 hours. It is surmised that this unique combination of properties can be attributed to the pre-crosslinked network and/or the inherent characteristic of an interpenetrating polymer network formed by the reaction product of at least one aqueous polymer dispersion and at least one water dispersible aminoplast resin.

A further aspect of the present invention relates to a method of enhancing the properties of water based pressure sensitive adhesives comprising the steps of:
 a) providing a water-based pressure sensitive adhesive comprising at least one water-based polymer selected from the group consisting of polyacrylic, polyurethane, polyurethane-acrylic hybrids, polyamides, styrene-butadiene rubber, polychoroprenes, acrylonitrile-butadiene-styrene, polyisoprene, polyisobutylene, polyurea, natural latex, polysaccharides, gum resins and combinations thereof; and
 b) reacting with at least one aminoplast resin present in an amount ranging from about 0.2% by weight to about 8% by weight based on total solids.

Another aspect of the present invention relates to a method for the preparation of dry-bond laminates, the method comprising the steps of:
 a) coating a first flexible substrate with a water-based pressure sensitive adhesive comprising the reaction product of:
  i) at least one water-based polymer selected from the group consisting of polyacrylic, polyurethane, polyurethane-acrylic hybrids, polyamides, styrene-butadiene rubber, polychoroprenes, acrylonitrile-butadiene-styrene, polyisoprene, polyisobutylene, polyurea, natural latex, polysaccharides, gum resins and combinations thereof; and
  ii) at least one aminoplast resin present in an amount ranging from about 0.2% by weight to about 8% by weight based on total solids;
 b) drying the coated substrate with forced air and heat, to form a dry-coated substrate; then
 c) applying onto the dry-coated substrate a second substrate using pressure.

Still another aspect of the present invention relates to a dry-bonded laminate comprising a pair of substrates adhesively bonded with a water-based pressure sensitive adhesive, said adhesive comprising the reaction product of:
 a) at least one water-based polymer selected from the group consisting of polyacrylic, polyurethane, polyurethane-acrylic hybrids, polyamides, styrene-butadiene rubber, polychoroprenes, acrylonitrile-butadiene-styrene, polyisoprene, polyisobutylene, polyurea, natural latex, polysaccharides, gum resins and combinations thereof; and
 b) at least one aminoplast resin present in an amount ranging from about 0.2% by weight to about 9% by weight based on total solids.

Another aspect of the present invention relates to a water-based pressure sensitive adhesive comprising: at least one water-based polymer comprising at least one ethylenically unsaturated monomer selected from the group consisting of acrylic acid, methacrylic acid, linear and branched $C_1$ to $C_{20}$ (meth)acrylic ester, hydroxyfimctional (meth)acrylates, acrylamide and methacrylamide, N-methylol acrylamide, N-methylolmethacrylamide, acrylonitrile, methacrylonitrile, fumaric acid, amino acrylates, styrene, vinyl ethers, vinyl acetate, vinyl esters, vinyl and vinylidene halides, N-vinyl pyrrolidone, ethylene, $C_3$ or greater -olefms, allyl amines, allyl esters of saturated monocarboxylic acids and amides thereof, propylene, 1-butene, 1-pentene, 1-hexene, 1-decene, allyl amines, allyl acetate, allyl propionate, allyl lactate, their amides, mixtures thereof, 1,3 butadiene, 1,3 pentadiene, 1,4 pentadiene, cyclopentadiene, hexadiene isomers and mixtures thereof; and at least one aminoplast resin present in an amount ranging from about 0.2% by weight to about 9% by weight based on total solids.

A further aspect of the present invention relates to the use of the water-based pressure sensitive adhesive in the manufacture of tapes, labels, medical devices and patches, flexible packaging, furnace ducts, exterior insulation finish system and the like.

Other aspects, objects, features and advantages of the present invention would be apparent to one of ordinary skill in the art from the following detailed description illustrating the preferred embodiments of the invention.

DETAILED DESCRIPTION OF THE INVENTION

The water-based pressure sensitive adhesives of the present invention exhibit excellent wet-out properties while the dried adhesives exhibits excellent flexibility, peel adhesion, and improved shear resistance when subjected to thermal and mechanical stress. The adhesives of the present invention preferably exhibit a substantial improvement in at least one adhesive property. More preferably, the pressure sensitive adhesive exhibits an improved balance of properties such that at least one property is enhanced while also maintaining or improving other properties simultaneously. Accordingly, the dried pressure sensitive adhesives preferably exhibit a "Loop Tack" of at least about 3 newtons/cm, and/or a peel strength of at least about 5 newtons/cm, and a "Shear Strength" of greater than about 10 hours at about 23° C. using a 1 kilogram static load.

The following glossary is provided as an aid to understand the use of certain terms herein. The explanation provided in the glossary are for illustrative purposes and do not limit the scope of the invention.

The term "$T_g$" or glass transition temperature as used herein means the temperature at which the polymer changes from glassy, brittle solid to a very high viscosity liquid. "$T_g$" can be calculated by a well known procedure as described, for example by T. Nielsen in "Mechanical Properties of Polymers" Reinhold Publishing Co. pp. 22–27 (1962).

The term "pot life" is defmed as a period of time during which a crosslinked and/or catalyzed water-based pressure sensitive adhesive can be used. Usually markedly shorter than the shelf life of the neat (i.e., un-crosslinked) water-based adhesive and is further defmed by the amount of time required to triple the initial viscosity of the crosslinked water-based adhesive.

The term "effective amount" as used herein is the amount which is sufficient to accomplish the intended purpose, e.g., reacting with latex, stabilizing and machining.

The aqueous polymer dispersions include water-based polymers such as polyurethane, polyurethane-acrylic hybrids, polyamides, styrene-butadiene rubber, polychloroprenes, acrylonitrile-butadiene-styrene, polyisoprene, polyisobutylene, polyurea, natural latex, polysaccharides, gum resins and combinations thereof. References describing such materials include U.S. Pat. No. 5,692,937 (Zhang); U.S. Pat. No. 4,888,395 (Min); and U.S. Pat. No. 5,354,807 (Dochniak), the disclosures of which are incorporated herein by reference.

The preferred aqueous polymer dispersions include polyacrylic dispersions such as styrene-acrylic, vinyl-acrylic, vinylester/vinylacetate/acrylic, ethylene vinyl acetate polymers and combinations thereof. These adhesives are-well known to one of ordinary skill in the art.

The term "acrylic" includes monoethylenically unsaturated monomers including acrylic, methacrylic, vinyl and allylic monomers, acrylate or methacrylate monomers. Additionally, acrylates can include acids, esters, amides and substituted derivatives thereof. Generally, the preferred acrylates are $C_1$–$C_{20}$ alkyl (meth)acrylates. The term "$C_1$–$C_{20}$ alkyl" refers to alkyl substituent groups having from 1 to 20 carbon atoms per group. Examples of such acrylates include ethyl(meth)acrylate, methyl(meth)acrylate, isobomyl(meth)acrylate, butyl (meth)acrylate, 2-ethylhexyl(meth)acrylate, isobutyl(meth)acrylate, isodecyl (meth)acrylate, lauryl (meth)acrylate, stearyl (meth) acrylate, cetyl (meth)acrylate, eicosyl (meth)acrylate, isodecyl (meth)acrylate, hexyl (meth)acrylate and mixtures thereof. As used herein, the terminology "alkyl (meth) acrylate monomer" refers to alkyl acrylate monomers and alkyl methacrylate monomers. The preferred amount of acrylic is at least about 30% by weight, preferably about 80% by weight of polymer weight. In addition, styrene, methyl styrene, olefin monomers such as 1-hexene and 1-octene and vinyl monomers such as neodecanoic acid, ethenyl ester may be used in place of acrylic or methacrylic. The preferred glass transition temperature, $T_g$ is about −80° C. to about −20° C. A more preferred $T_g$ is about −70° C. to about −30° C., most preferably, about −65° C. to about −40° C.

The term "polyacrylic" is defmed as a polymer containing two or more free-radically polymerized ethylenically-unsaturated monomers.

The term "ethylenically unsaturated monomer" is defined as any compound containing acrylic groups, vinyl groups, allylic groups, acrylamide groups or N-methylol acrylamide.

As used herein, "monoethylenically unsaturated carboxylic acid monomer" means having a single site of ethylenic unsaturation per molecule. Suitable monoethylenically unsaturated carboxylic acid monomers include, for example, acrylic acid, methacrylic acid, itaconic acid, crotonoic acid, fimaric acid and mixtures thereof. A preferred embodiment for the monoethylenically unsaturated carboxylic acid monomer is acrylic acid, methacrylic acid or a mixture thereof.

The term "dispersion" as described herein is defined as a polymer suspended in an aqueous medium and is also intended to cover solutions and dispersions.

At least one aqueous polyacrylic dispersion is present in the inventive pressure sensitive adhesives in a range of from about 90% by weight to about 99.8% by weight, and most preferably, from about 90% by weight to about 95% by weight, based on the total solids of the water-based pressure sensitive adhesive. Percentages outside these ranges may be undesirable to the adhesives bonding characteristics. For example, a polyacrylic dispersion content greater than about 99.8% by weight can limit the amount of melamine-formaldehyde resin agent present, thus reducing the cured products' crosslink density. Alternatively, a polyacrylic dispersion content less than about 90% by weight can be undesirable in that less polyacrylic tends to reduce the tack and peel strength. A preferred aqueous polyacrylic dispersion is PD-8118, a commercially available styrene-acrylic from H.B. Fuller Company (St. Paul, Minn.). The polyacrylic dispersion can have a solids content in a range of from about 30% by weight to about 70% by weight based on total solids, a pH in a range of from about 2 to about 11 and a viscosity in a range of from about 5 to 5000 mPa.s.

The aqueous polyacrylic dispersions described in the present invention can have a weight average molecular weight distribution of the high polymer, (Mw) in a range of from about 100,000 grams/mole to about 300,000 grams/mole, preferably in a range of from about 100,000 grams/mole to about 200,000 grams/mole. A Mw distribution greater than about 300,000 grams/mole may be undesirable to the pressure sensitive adhesives tack characteristics. Alternatively, a Mw of less than about 100,000 grams/mole may be undesirable to the dried fihns shear strength in that chain entanglement is often reduced to form polymers having decreased cohesive strength. Furthermore, the aqueous polyacrylic dispersions can have a polydispersity (Mw/Mn) in a range of from about 4 to about 1, preferably in a range of from about 3 to about 1. A polydispersity greater than about 4 may be undesirable to the pressure sensitive adhesives tack characteristics in that higher molecular weight polymers (Mw) often stiffen the dried pressure sensitive adhesives making them less tacky. Alternatively, a polydispersity less than about 1 may be undesirable in that lower molecular weights (Mw) can decrease shear strength as described above.

Aminoplast resins are synthetic resins and are products from the reaction of formaldehyde and a monomeric amidogen compound containing not less than two amidogen grouping, each having at least one hydrogen atom attached to the amidogen nitrogen atom. Typical examples include urea-formaldehyde resin, melamine-formaldehyde resin, alkylated melamine-formaldehyde resin, e.g., methylmelamine-formaldehyde resin, guanamine-formaldehyde resin, glycoluril-formaldehyde resins, acetoguanamine-formaldehyde resin and combinations thereof.

Aminoplasts which are water soluble or water dispersible for the instant purpose include Cymel 301®, Cymel 370®, and Cymel 373®, commercially available from American Cyanamid. The aminoplasts are melamine based, e.g., hexamethoxy-methyl melamine or methylated or butylated ureas. The mono-, di-, or triaryl melamines, such as 2,4,6-triphenyltriamino-1,3,5-triazine, are preferred. Other aldehydes used to react with the amino compound to form the resinous material are crotonic aldehyde, acrolein, or compounds which generate aldehydes, such as hexamethylenetetramine, paraldehyde, and the like. The aminoplast is added in the amount of about 0.2% to about 8% by weight, more preferably about 0.3 to about 6%, most preferably, about 0.5% to about 4% by weight, based on the total solids.

At least one water dispersible and/or water soluble melamine-formaldehyde resin is used. The melamine-formaldehyde resins may be partially or fully alkylated and are preferably soluble or dispersible in water. Commercially available resins include Cymel® Resin 303, 385 and 325 from Cytec Industries, Inc. (West Paterson, N.J.). A most preferred water-soluble melamine-formaldehyde resin is Astro Mel 400, which is an alkylated melamine-formaldehyde resin commercially available from Borden Chemical, Inc. (Morganton, N.C.). A melamine-formaldehyde resin content greater than about weight may be undesirable to the adhesives pot stability in that greater amounts of the resin tend to gel the water-based pressure sensitive adhesives by increasing its crosslink density. Alternatively, a melamine-formaldehyde resin content of less than about 0.2% by weight can reduce the adhesives crosslink density to form a bond having decreased shear resistance making them less resistant to thermal and mechanical stresses. It is surmised that the melamine-formaldehyde resin reacts with the aqueous polyacrylic dispersion to form a vast three-dimensional network, which may contain interpenetrating polymer networks. A certain amount of crosslink density is needed to form a bond having good tack and peel strength. In general, as depicted in the prior art, high amounts of melamnine-formaldehyde resin was used as a crosslinking agent, i.e., more than 10% by weight. Surprisingly, the present inventors accomplished crosslinking by using melamine-formaldehyde resin of less than about 8% by weight, as well as an adhesive having enhanced loop tack, peel strength and shear strength.

The term "interpenetrating polymer network" is defined as a crosslinked and/or semi crosslinked syste mprisg at two dissimilar or different polymers. IPNs are further described in the "Handbook of Adhesives", Irving Skeist, 3rd edition, chapter 1, page 18, Van Nostrand, N.Y., 1990.

The acrylic polymer can be made by various addition polymerization techniques for polymerizing ethylenically unsaturated monomers and is well known in the art. Preferably, the polymer is made by free radical initiated aqueous emulsion polymerization. Typical acrylic adhesives are described in Ulrich, U.S. Pat. Re No. 24,906 and U.S. Pat. No. 2,884,126; Samour, U.S. Pat. Nos. 3,299,010 and 3,400,103; Sanderson et al. U.S. Pat. Nos. 3,740,366 and 4,077,926, the disclosure of which are incorporated herein by reference. The acrylic polymer may be any of those traditionally used in adhesives industry such as Acronal® from BASF. Acronal® is derived from acrylates, more specifically acrylic homopolymers and copolymers, dispersions for building adhesion, pressure sensitive adhesives, packing adhesives and sealants. The acrylic polymer may optionally include up to about 70% by weight, preferably about 30% by weight repeating units derived from ethylenically unsaturated carboxylic acid monomers that are copolymerizable with the above disclosed $C_1$–$C_{20}$ alkyl (meth)acrylate monomers such as for example, vinyl esters such as vinyl acetate and vinyl aromatic monomers such as styrene and vinyl toluene, (meth)acrylamide, e.g., acrylamide and methacrylamide, and mixtures thereof.

The styrene-acrylic based pressure sensitive adhesives are also well known to those skilled in the art. A particularly preferred material is a carboxylic acid functional styrene-acrylic resin such as Joncryl® 67, Joncryl® 63 and Joncryl® 690 commercially available from S.C. Johnson Wax of Racine, Wis. The ratio of the amount of styrene to acrylic is about 0 to about 40, preferably about 15 to about 25.

Another class of pressure sensitive polymers useful in the present invention are vinyl/acrylic pressure sensitive adhesives. Such adhesives are also well known to those skilled in the art. Typical vinyl-acrylic based pressure sensitive adhesives are described in Wiest et al., U.S. Pat. No. 4,322,516. See also, "The Handbook of Pressure Sensitive Adhesives Technology", Van Nostrand, Reinhold Co. N.Y. (1982). The ratio of the vinyl to acrylic is in the range of about 0 to about 70, preferably about 30 to about 50.

The ethylene vinyl acetate based pressure sensitive adhesives are also well known to those skilled in the art. Typical ethylene vinyl acetate based pressure sensitive adhesives are described in Jubilee et al., U.S. Pat. No. 3,222,419, Oyamada, U.S. Pat. No. 4128518 and Knutson, U.S. Pat. No. 3,734,819, the disclosures of which are incorporated herein by reference. The ratio of ethylene to vinyl acetate is in the range of about 10 to about 40, preferably about 20 to about 30.

The vinyl ester/vinyl acetate/acrylic pressure sensitive adhesives are described in Lazear et al., U.S. Pat. No. 4,185,050, the disclosures of which are incorporated herein by reference.

In general, the pressure sensitive adhesive polymer will be employed in amounts of at least about 20% to about 99.8% by weight. In an adhesive comprising a pressure sensitive adhesive and an aminoplast resin, the adhesive polymer will be employed in amounts of at least about 95% to about 98.8% by weight. However, in a formulated system, for example comprising a pressure sensitive adhesive, natural rubber, tackifier, and aminoplast resin, the adhesive polymer can be employed in amounts of at least about 40% to about 50% by weight.

The water-based pressure sensitive adhesives of the present invention are often prepared in accordance with known mixing procedures. For example, a fully prepared aqueous polyacrylic dispersion is blended with the water dispersible and/or soluble melamine formaldehyde resin using mild agitation. The ingredients are generally added to the mixer in the order of addition wherein the ingredient present in the least amount is added to the ingredient present in the greatest amount. Thus, the aqueous polyacrylic dispersion is preferably added first to the mixer and the melamine-formaldehyde resin is added to the dispersion.

Alternatively, the water-based pressure sensitive adhesives may be formed using a process wherein the aminoplast resin is added prior to and/or during the preparation of the aqueous polyacrylic dispersion. For example, the water dispersible melamine formaldehyde resin can be used as a seed during the free-radical polymerization process to form a core-shell type particle morphology and/or the resin can be added to the ethylenically-unsaturated monomer composition (pre-emulsion). The seed emulsion process and the resulting particle morphology is further described in the article entitled "Characterization of Interfaces in Core-Shell Polymers by Advanced Solid-State Methods", Macromolecules, 29: 5972–5980 (1996).

If desired, small quantities of acid catalyst or blocked acid catalysts may be used to accelerate the melarnine-formaldehyde resin condensation reaction. Examples include para-toluene sulfonic acid (PTSA) and the triethylamine salts of PTSA. The catalysts can be present in a range of from about 0.05% by weight to about 5.0% by weight, and preferably from about 0.1% by weight to about 1.0% by weight, based on the total solids of the water-based pressure sensitive adhesive. A commercially available blocked acid catalyst includes Nacure XP-357® which is a blocked para-toluene sulfonic acid from King Industries, Inc. (Norwalk, Conn.).

The water-based pressure sensitive adhesives of the present invention can have a monomodal or multimodal particle size distribution. Furthermore, the average particle size distribution can be in a range of from about 40 nanometers to about 4 microns, and preferably from about 100 nanometers to about 800 nanometers. An average particle size distribution greater than about 800 nanometers may be undesirable to the dispersions' stability and/or film forming characteristics. For example, aqueous polyacrylic dispersions having an average particle size distribution greater than about 800 nanometers often settle over time. Increased sedimentation may be detrimental in that such a destabilization can produce irregular coat weights and may form dry-bonded laminates having reduced optical clarity.

The inventive adhesives can have a solids content in a range of from about 40% by weight to about 70% by weight, and preferably from about 50% by weight to about 65% by weight. A solids content outside the preferred range may be undesirable for certain applications. For example, an aqueous pressure sensitive adhesive having a lower solids content often requires extended dry times. Alternatively, a higher solid content often forms adhesives having increased viscosities making them more difficult to process.

The water-based pressure sensitive adhesives described in the present invention preferably have a pH in a range of from about 3 to about 11, preferably from about 3 to about 9. Preferably, the aqueous polyacrylic dispersions are ionically stabilized using counter cations such as alkali metal hydroxides, tertiary amines, sodium carbonates and ammonia hydroxide. The preferred counter cations are ammonia hydroxide and sodium bicarbonate.

In another embodiment, trialkylamines or trialkylolamines are added to obtain a heat activated water based pressure sensitive adhesive. The pressure sensitive adhesive behaves like a removable adhesive at room temperature and can be converted into a strong adhesive once the temperature is raised and the amine liberated. The amine blocks the crosslinking chemistry of the melamine resin by pH and steric hindrance. Suitable trialkylamines include trimethylamine, triethylamine, tributylamine, trihexylamine and the like. Suitable trialkylolamines include trimethylolamine, triethylolamine, tributylolamine, trihexylolamine and the like. The trialkylamine or trialkylolamine is added in the range of from about 0% to about 2%, preferably about 0.5% to about 1% by weight. A preferred trialkylamine is triethylantine. A preferred trialkylolamine is triethylolamine. A commercially available triethylolamine is a 98% solution.

The inventive adhesives can have viscosities in a range of from about 20 mPa.s to about 2000 mPa.s, and preferably from about 300 mPa.s to about 1600 mPa.s at about 25° C. In many pressure sensitive adhesive applications, lower viscosities are often preferred in that it allows the end user to selectively increase the viscosity, if desired, with effective amounts of thickening agents. It has been observed that low viscosities may not be beneficial when wetting-out silicone release paper. Alternatively, pressure sensitive adhesives having a higher viscosity (i.e., greater than about 2000 mPa.s) may be undesirable in some applications where low viscosities are required for enhanced processing. However, if lower viscosities are required, an end user often reduces the viscosity using additional solvent, though this may be undesirable in that higher levels of solvent can extend the dry times and often slows down the production process. Special drying equipment such as heaters may be used to accelerate the evaporation of the excess solvent but this accommodation can increase the complexity and cost of the operation.

The present invention may frier comprise one or more aqueous polymer dispersions. Suitable examples include water-based polyamides, water-based polyurethanes, and their mixtures.

If desired, non-formaldehyde based water dispersible polyflnctional crosslinking agents can be formulated with the water-based pressure sensitive adhesives described in the present invention. Such additives are often added immediately prior to the bonding process and may enhance properties including adhesion, solvent resistance and heat resistance. Suitable crosslinking agents can be selected from polyisocyanates, polyoxazolines, polycarbodiimides, polyaziridines, polyepoxies and mixtures thereof. The crosslinking agents can be present in the formulations in a range of from about 0.2% by weight to about 5% by weight, and preferably from about 1% by weight to about 3% by weight based on the total weight of the formulation.

The characteristics of the water-based pressure sensitive adhesives may be further modified by the addition of compounds including surfactants, defoarning agents, coalescing aids, tackifier, fungicides, curing agents, bactericides, plasticizers, thickening agents, fillers, reactive pigments, UV stabilizers, adhesion promoters, perfume-like materials, sequestering agents, organic co-solvents including acetone and n-methylpyrrollidinone, water dispersible waxes, oils, fire retardant agents, antioxidants, accelerating agents and their mixtures. Such materials may be introduced at any stage of the production or end-use process.

A tackifier may optionally be blended using conventional blenders to provide a homogeneous mixture. The tackifier may be added in an amount of from about 1% to about 60% by weight, more preferably from about 20% to about 40% by weight. Examples of tackifiers include alkyl phenyl resin, emulsified rosin, partially decarboxylated rosin, glyceryl esters of polymerized rosin, partially dimerized rosin, hydrogenated esters of rosin, modified rosin esters, esters of polymerized rosin, esters of hydrogenated rosin, hydrocarbon resin, linear homopolymers of -methyl styrene, -methyl styrene copolymer resin, -pinene terpene hydrocarbon resin, d-limonene types, aliphatic hydrocarbon, aromatic modified $C_5$ hydrocarbon resin, vinyltoluene, pinene terpene resin, polycyclic hydrocarbon resin, technical hydroabiethyl alcohol, pentaerytlritol, ethylene, vinyl acetate, polydicyclopentadiene resins and coumarone/indene resins.

The water-based pressure sensitive adhesive in accordance with the present invention may be used to bond substrates including steel, aluminum, copper, brass, plastics, i.e., polyethylene, low density polyethylene, linear low density polypropylene, oriented polypropylene, polyester, nylon, ethylene, vinylacetate, polyvinyl chloride, polyesters, metallized polyester, polyamides, polyurethanes, polyvinyl chloride, PET, prepainted surfaces, glass, metal films, paper, wood, paper cardboard, fiberboard, gypsum board and combinations thereof. A first substrate may be a sheet like material such as for example, a sheet of paper, a polymer film, a textile fabric or a non-woven fiber sheet. The adhesive article of the present invention is correspondingly a sheet like material such as for example, a pressure sensitive adhesive tape.

The water-based pressure sensitive adhesive of the present invention may be applied to a substrate and then dried using conventional substrates and procedures. The adhesive is applied to the substrate using coating techniques such as brushing, spraying, roller coating, blade coating, wire wound rod coating, knife coating or curtain coating, meyer rods, slot die or gravure and air coolers. The coated substrate is then dried by using methods known to one of ordinary skill in the art such as by passing through a heating tunnel or oven, through which circulating hot air is used, or tunnel or oven may contain infrared lamp to dry the coated substrate. The drying time will be a function of a number of factors such as heat capacity of the substrate, the type of heating, the oven temperature, air velocities (if circulating air is used) and the rate of passage of the substrate through the heater. When a circulating oven is used, it is preferred that the adhesive is dried at a temperature of about 50° C. to about 85° C. at ambient pressure for about 0.25 to about 1 minute.

One area of use includes preparing tapes, labels, decals, stickers, medical patches and devices and the like by direct coating onto the film, label, tape, or device facestock and either permanently bonding it to another film, target surface or a release film (which will be peeled off when bonded to target surface). Alternatively, the water based pressure sensitive adhesive may be coated directly onto a release film and then bonded to the appropriate facestock. The release film is removed at a later time and the facestock is bonded to the target surface.

The adhesive may be coated with any type of coating machine like a three-roll, gravure, reverse gravure, meyer rod, slot die, knife over roll or sprayed, extruded, brushed, or gravity fed etc. The adhesive may be dry bonded or wet bonded. Dry bonding is a process wherein the adhesive is applied to one film and then completely dried before it contacts another film component. Wet bonding is a process wherein the adhesive is applied to one film, the adhesive is then contacted with another film while the adhesive is wet, and the contacted structure is then dried. The adhesive may also be applied to one film, dried, and then wound up on itself like a tape. Typically, the film can be paper, olefin (polypropylene, polyethylene, etc), polyester, vinyl chloride, vinylidene chloride, glycine, cellulosic, cardboard, metal, wood, fabric (textile), nonwoven, and the like. The target surface can be anything.

The substrate used depends upon the intended use. For instance, the adhesive may be coated onto a backing member and dried to provide the pressure sensitive coated sheet materials such as tapes, sheets, labels, decals, stickers or panels. Cellophane, vinyls, cloth, polyester film, rubber, various laminates and other such flexible materials such as wood, metal, hardboard and other less flexible coatings can be coated in this manner. In the case of tape, the coated, dried product is generally self wound in a roll form. As an alternative to coating the substrate directly, the adhesive is coated onto a release liner such as silicone release paper type such that the finished product is called a transfer tape. Preferably, the silicone release paper has a surface tension of at least less than about 45 dynes/cm. In use, the exposed adhesive surface of the tape is placed in contact with a desired substrate, the release liner is stripped away and the newly exposed adhesive is surface bonded to a second substrate. The process comprises drying the water based pressure sensitive adhesive on silicone release paper, adhering the adhesive to a first substrate such as a paper face stock, and tearing off the release paper to bond to a second substrate.

In the manufacture of tapes and labels, the substrate is generally in sheet form. The sheet may be a polymeric material which is flexible at room temperature and may be a homopolymer of an ethylenically unsaturated monomer such as ethylene, propylene or vinyl chloride or be a polyester or polyamide provided it has sufficient flexibility for the desired end result. Alternatively, the substrate may be made from cellulosic material or reconstituted cellulose, such as rayon. The substrate need not be a sheet material but may be composed of fibers which may be woven or nonwoven as for example, paper. Woven substrates may be made of cellulosic material such as cotton, or from fibers of any of the above mentioned polymers.

Any backing or substrate is useful and can include textile fabric, plastic film, nonwoven fiber sheets including water laid and air laid products, metal sheets or foil, rubber or synthetic rubber, decorative sheets, plywood edging or plywood sheets, decals and the like. If in a roll, the back of the tape is usually coated with release, backsize or adhesive coating. Two sided articles are also useful. If not coiled into a roll, strippable paper or other protective means is provided. Usually, the face of the backing to which the pressure sensitive adhesive is applied is sized to improve the adhesion of the backing and the adhesive.

After drying, the substrate may be cut to a required dimension. In the manufacture of tape, the substrate is cut into strips and rolled to provide a finished product. The substrate may also be cut into shaped items to provide labels or medicine tapes.

The dry-coat weights for the pressure sensitive labels are preferably in a range of from about 8 grams/m$^2$ to about 35 grams/m$^2$.

The adhesives of the present invention may also be used as a contact adhesive. A contact adhesive is defined as an adhesive apparently dry to the touch that will adhere to itself instantaneously upon contact. Adhesives of this type can be employed in a variety of packaging applications including for example, flexible packaging for candy wrappers, chips etc.; medical packaging; self-seal and tamper evident packaging; banding for paper money; napkins; clothing; and protective packaging such as fold over "blister" packages for hardware and small parts. Additionally, the inventive contact adhesives may be useful as an anti-skid.

Another area of use includes preparing flexible film structures for packaging. The package is usually made into a bag to hold a variety of products, such as from foods to consumer goods. The furnished structure is a film to film structure. The water based pressure sensitive adhesives can be coated and dried on a primary film and then bonded to another film (dry bonding), or wet bonded as described above. The type of films can be anything that is flexible, as listed above. The adhesive can be applied by any type of coater.

In the manufacture of flexible packages, the process comprises applying a layer of the water-based pressure sensitive adhesive to at least one selected section of a flexible substrate and forming at least one joint between said substrate and another section of the same or different substrate by sandwiching said adhesive layer therebetween. The flexible package comprises at least one flexible substrate, at least one joint between a selected section of the substrate and another section of the same or different substrate, and a layer of the water based pressure sensitive adhesive between said substrate and said another section.

The water-based pressure sensitive adhesive may be used in film lamination such as dry bond laminates, consolidated adhesive articles, labels, film to film packaging structures and the like. After the adhesive is dried on a first substrate, a second substrate is contacted with the adhesive film. This substrate may be of the same or different material in comparison to the first substrate. The second substrate can be applied to the adhesive film by application of pressure and temperature commonly used in film laminating equipment. The use of different substrates allows one to prepare a laminate combining properties of rather varied substrates which properties would otherwise be impossible to contain a single flexible film. Thus, it may be desirable to laminate one film to another film having excellent strength characteristics. The choice of substrates would be up to one skilled in the art to achieve a laminate of the particular desired properties for that user. The first substrate has a different surface tension as compared to the second substrate, for example, the first substrate may have a lower surface tension as compared to the second substrate.

The use of heat and pressure to apply the second substrate facilitates bonding and crosslinking. Typically a film coating and laminating apparatus will run at the rate of about 30 meters to about 400 meters per min., will use a drying oven 3 meters–10 meters long at about 50° C. to about 150° C. and will apply the second film substrate to the dried adhesive at a nip pressure of about 40 kg/cm$^2$ and a temperature of about 40° C. to about 105° C. Other application, drying and curing temperatures, however, can readily be employed by those skilled in the art.

In a preferred embodiment, the adhesive is applied to a surface of the first substrate in an amount effective to provide a dry adhesive layer of about 1 gram/square meter (g/m$^2$) to about 32 g/m$^2$ on the coated portion of the surface of a first substrate. The dry-coat weights for the bonded dry-bonded laminates are preferably in a range of from about 0.15 grains/m² to about 7 grams/m², preferebly about 1.5 grams/m² to about 5 grams/m².

Still another area of use is preparing structures for packaging engineering applications. An example is for a flex duct for heating systems. In this structure, the water-based pressure sensitive adhesive is coated and dried on two sets of polyethylene terephthalate (PET) films, the films are turned, and a metal wire or scrim is sandwiched in between the two films. The flexible duct comprises a) a first and second adhesive layer comprising a water-based pressure sensitive adhesive coated on at least one substrate; and b) a reinforcing material selected from the group consisting of metal wire and scrim; said material sandwiched between the first and second adhesive layers. The resulting structure is a tube based on a structure such as a PET/Adhesive//Wire//Adhesive/PET structure. This type of structure is used as a flexible duct for heating systems.

Another structural application is the bonding of rigid sheets to a target surface. One example is bonding a panel made out of recycled plastic and wood (sometimes called polywood), wood, cardboard, fiberboard, plastic, metal and the like to a wood or metal frame. More specifically, the use would include attaching decorative panels in mobile homes.

The water-based pressure sensitive adhesives are also used in making exterior insulation finish systems (EIFS). EIFS are well known in the art. EIFS are used to insulate existing buildings and buildings under construction including industrial, residential, commercial, municipal and institutional buildings. Installation of a typical EIFS comprises the steps of: a) constructing a frame for the support of the outside wall of a building; b) affixing to the frame structural panels to provide a smooth continuous surface for the support of other components; c) affixing to the support, surface panels of insulation; and d) affixing to the panels a mesh like material which is covered with an EIFS. EIFS typically comprise a layer of a substrate such as gypsum, an insulation layer such as polystyrene, a mesh embedded in a coat of polymer and cement, and a polymeric finish. Although these systems are waterproof, problems occur due to water penetration through a variety of venues such as cracks, joints or sealant failures. These problems include loss of attachment to the system, deterioration of the gypsum sheathing, delamination of coatings, corrosion or rotting of structural members and interior building damage.

The exterior insulation finish system of the present invention comprises in sequence a plurality of layers including: a) a layer of substrate or sheathing; b) an adhesive layer adhered to said substrate or sheathing; said adhesive comprising the water-based pressure sensitive adhesive; c) a layer of insulating foam fastened through said adhesive to said substrate or sheathing; d) a fiberglass reinforcing mesh layer embedded in a base coat; and e) an outer polymer layer comprising an acrylic finish coating.

As mentioned, the adhesives can be applied to a wide variety of substrates including paper, polyethylene, polypropylene, polyester, nylon, ethylene, vinylacetate, cellophane, polyvinyl chloride, metallized films, aluminum foil and combinations thereof. The adhesives of the present invention may be coated onto flexible substrates using conventional coating units. A suitable unit includes the geometric C/L-400 coater laminator from Geometric Machines (Edison, N.J.). The laminating process typically involves roll coating the adhesive using a gravure cylinder, onto a first flexible substrate at an application rate of 0.25 grams/meters² to about 10.0 grams/meters², based on solids. After the adhesive has been applied, it was dried at a temperature of about 25° C.–200° C. using methods known in the art, i.e., circulating ovens, gas impingement drier, infrared radiation, heat lamps. The dry coated substrate is then mated with a second flexible substrate or web, which may be the same or different from the first substrate. Typically, the substrates are mated together using a nip pressure of about 1.4 kgs/cm² to about 4.2 kgs/cm² and a nip temperature of about 25° C. to about 200° C. for 1–2 seconds.

All of the cited patents and publications are incorporated herein by reference. The following specific examples are provided to better assist the reader in the various aspects of practicing the present invention. As these specific examples are merely illustrative, nothing in the following descriptions should be construed as limiting the invention in any way.

EXAMPLES

Test Methods

Peel Adhesion

180° peel is a measure of the force required to remove an adhesive from a substrate after a specified period of dwell and at a specific angle and removal rate. It is determined in accordance with Pressure Sensitive Tape Council test (PSTC™1). In the test, $5.1 \times 10^{-3}$ cm thick polyester was coated with the adhesive. The adhesive was dried with a heat gun and aged overnight. The adhesive coated strip was cut into 2.54 cm. wide strips, attached to a stainless steel panels, then pressed onto the panels by rolling twice, once each in opposite directions with a 2.5 kg rubber roller. After one minute (repeated for 24 hour dwell), one end of the test panel is clamped into a tensile tester; the free end of the panel is doubled back until it is almost touching itself making an angle of 180° with the panel, and clamped into the other jaw of the tensile tester. The average force required to separate the adhesive from the panel is recorded as peel adhesion. The test is run at 30 cms/minute.

Loop Tack

Loop tack is a measure of the force required to remove a loop of adhesive from a test substrate after a very short dwell and no external pressure. A 2.54 cm. wide adhesive strip is clamped in the "form of a loop" in the upper jaw of a tensile testing machine so that it hangs vertically with the layer of the adhesive on the outside. The loop is lowered onto the substrate until the adhesive contacts an area of one square inch. As soon as the tape makes one square inch of contact area with the substrate, the loop is retracted from the substrate. Loop tack is defined as the maximum force required to separate the loop from the substrate.

Shear Strength (Holding Power)

Shear strength (holding power) is a measure of the cohesiveness or internal strength of the adhesive. The shear strength was determined in accordance with Pressure Sensitive Tape Council method (PSTC™7).

The shear strength was measured by transferring the adhesive onto a $5.1 \times 10^{-3}$ cm thick PET film at a sample thickness of $2.3 \times 10^{-3}$ cm. The coated sample (2.54 cm in width) is then applied to a stainless steel panel with a $2.0 \times 10^{-3}$ cm primed overlap joint. A 30 minute dwell time was used prior to attaching a one kilogram weight. A one kilogram weight was suspended from the sample with the primed steel panel and maintained vertically and the time until separation occurs is measured. The test is carried out at room temperature unless indicated otherwise. The test is a measure of the structural cohesive strength and ability to maintain cohesive strength over a period of time at elevated temperatures. Thus, the adhesive showing the longest times are preferred.

Molecular Weight

Molecular weight distribution was determined using a method wherein the water-based pressure sensitive adhesive was pre-dissolved in tetrahydrofuran, then characterized by GPC calibrated with polystyrene standards. A Waters 510 pump and 410 refractive index detector, equipped with Waters styragel columns HR5E(2) and HR1 were used.

Viscosity

Viscosity of the water-based pressure sensitive adhesives were measured on a Brookfield RVF-100, at ambient room temperature (23° C.–25° C.), using spindle ™2 run at 20 r.p.m.

Particle Size

Particle Size Distribution of the water-based pressure sensitive adhesives were determined using a BI-90 particle sizer from Brookhaven Instruments Corporation (Holtsville, N.Y.).

Example 1

Example 1-A describes a water-based pressure sensitive adhesive that is part of the present invention.

99 grams of the aqueous polymer dispersion PD-8118, which is a commercially available styrene-acrylic copolymer from H.B. Fuller Company (St Paul, Minn.), was blended with 1 gram of AstroMel-400®, which is a commercially available water soluble melamine-formaldehyde resin from Borden Chemical Inc. (Morganton, N.C.), to form a water-based pressure sensitive adhesive having a viscosity of 500 mPa.s, a pH of 4.5, and a solids content of 59%. The inventive water-based adhesive was aged 21-days at ambient room temperature then coated onto 41.7 kilogram (92 pounds) silicone release paper ™UE-1094, commercially available from Douglas Hanson (Hammond, Wis.). The wet coated substrate was dried to obtain a dry-coat weight of approximately 21 grams/cm². The dry-coated substrate was allowed to equilibrate at ambient room temperature (23° C.–25° C.) for 24 hours. The dry-coated substrate was then laminated onto $5 \times 10^{-3}$ cm thick polyester film using a standard 2.0 kilogram (approx. 4.5 pound) roller. The adhesive bonded laminate had a 1-minute peel strength of 2.3-kilograms (5 pounds; 8.9 newtons/cm), a 24 hour peel strength of 2.1 kilograms (4.7 pounds; 8.3 newtons/cm), and a shear strength of 71 hours. The equilibrated substrate had a loop tack of 3 kilograms (6.6 pounds; 11.7 newtons/cm).

Example 1-B describes a water-based pressure sensitive adhesive that is not part of the present invention.

Example 1-B was run exactly as described in Example 1-A with the exception the melamine formaldehyde resin was excluded. The water-based pressure sensitive adhesive had a viscosity of 1200 mPa.s, a pH of 4.8, and a solids content of 60.5%. The dry-coated substrate had a loop tack of 2.4 kilograms (5.4 pounds; 9.6 newtons/cm). The adhesively bonded laminate had a 1 minute peel strength of 2.1 kilograms (4.7 pounds; 8.3 newtons/cm), a 24 hour peel strength of 2.6 kilograms (5.8 pounds; 10.3 newtons/cm), and a shear strength of 8 hours.

The data indicate that Example 1-A has increased peel strength, loop tack, and shear strength compared to Example 1-B, thus showing the utility of the invention.

Example 2

Example 2-A describes a water-based pressure sensitive adhesive that is part of the present invention.

99 grams of the aqueous polymer dispersion PD8118 (H.B. Fuller Company, St Paul, Minn.) was blended with 1 gram of AstroMel-400® to form a water-based pressure sensitive adhesive having a viscosity of 850 mPa.s., a pH of 4.8, and a solids content of 59.9%. The inventive water-based adhesive was aged 30 days at ambient room temperature then coated onto the silicone release paper as described in Example 1. The wet coated substrate was dried to obtain a dry-coat weight of approximately 21 grams/cm². The dry-coated substrate was allowed to equilibrate at ambient room temperature (23° C.–25° C.) for 24 hours. The dry-coated substrate was aged at ambient room temperature for 21 days and then laminated onto a $5 \times 10^{-3}$ cm thick clear Polyester film from Douglas-Hanson (Hammond, Wis.) using a standard 2.0 kilogram (approx. 4.5 pound) roller. The adhesively bonded laminate had a 1 minute peel strength of 0.95 kilograms (2.1 pounds; 3.7 newtons/cm), a 24 hour peel strength of 2.3 kilograms (5.1 pounds; 9.0 newtons/cm) and a shear strength of 46 hours. The equilibrated substrate had a loop tack of 1 kilogram (2.2 pounds; 3.9 newtons/cm).

Example 2-B describes a water-based pressure sensitive adhesive that is not part of the present invention.

Example 2-B was run exactly as described in Example 2-A with the exception the melamine formaldehyde resin was excluded. The water-based pressure sensitive adhesive had a viscosity of 1400 mPa.s., a pH of 4.5, and a solids content of 60%. The dry-coated substrate had a loop tack of 1.8 kilograms (4 pounds, 7.1 newtons/cm). The adhesively bonded laminate had a 1 minute peel strength of 2.0-kilograms (4.5 pounds; 8.0 newtons/cm), a 24 hour peel strength of 2.3 kilograms (5.0 pounds; 8.9 newtons/cm) and a shear strength of 6 hours.

The data indicate that Example 2-A has increased peel strength, loop tack, and shear strength compared to Example 2-B, thus showing the utility of the invention.

Example 3

Example 3 describes a water-based pressure sensitive adhesive that is not part of the present invention.

94 grams of the aqueous polymer dispersion PD-8118 (H.B. Fuller Company, St Paul, Minn.) was blended with 6-grams of AstroMel-400® to form a water-based pressure sensitive adhesive having a viscosity of 50 mPa.s, a pH of 5.2, and a solids content of 49.8%. The water-based pressure sensitive adhesive gelled within 24 hours.

The data indicate that a high concentration of melamine-formaldehyde resin can destabilize the water-based pressure sensitive adhesive at the indicated pH.

Example 4

Example 4 describes a water-based pressure sensitive adhesive that is part of the present invention.

98 grams of the aqueous polymer dispersion PD-8118 (H.B. Fuller Company, St Paul, Minn.) was increased to a pH of 9.3 using an effective amount of ammonia hydroxide. The dispersion was then blended with 2 grams of AstroMel-400® to form a water-based pressure sensitive adhesive having a viscosity of 195 mPa.s, a pH of 9.3, and a solids content of 50%. The inventive water-based adhesive was aged 30 days at ambient room temperature then coated onto the silicone release paper described in Example 1. The wet coated substrate was dried to obtain a dry-coat weight of approximately 21-grams/cm². The dry-coated substrate was allowed to equilibrate at ambient room temperatures (23° C.–25° C.) for 24 hours. The equilibrated substrate had a loop tack of 0.7 kilogram (1.35 pounds; 2.7 newtons/cm). The dry-coated substrate was laminated onto 5×10$^{-3}$ cm polyester using a standard 2.0 kilogram (approx. 4.5 pound) roller. The adhesively bonded laminate had a 1 minute peel strength of 0.4 kilograms (0.9 pounds; 1.6 newtons/cm), a 24 hour peel strength of 1.6 kilograms (3.5 pounds; 6.2 newtons/cm), and a shear strength of 167 hours.

The data indicate that an elevated concentration of melamine-formaldehyde resin can form a stable water-based pressure sensitive adhesive at the indicated pH.

Table I shows a comparison of the 180° peel, static shear, loop tack, % solids and viscosity of Examples 1–4.

TABLE I

| Examples | 180 deg Peel 1 MIN | | 24 HR | | STATIC SHEAR | LOOP TACK | % MF | % SOLID | VISC 20 | pH | Age |
|---|---|---|---|---|---|---|---|---|---|---|---|
| Ex. 1-A | 8.9 | C | 8.3 | C | 71 | 11.7 | 0 | 60.5 | 1200 | 4.8 | 21 |
| Ex. 1-B | 8.3 | C | 10.3 | C | 8 | 9.6 | 1 | 59.0 | 500 | 4.5 | 21 |
| Ex. 2-A | 3.7 | A | 9.0 | C | 46 | 3.9 | 0 | 60 | 1400 | 4.5 | 30 |
| Ex. 2-B | 8.0 | C | 8.9 | C | 6 | 7.1 | 1.0 | 59.9 | 850 | 4.8 | 30 |
| Ex. 3 | GELLED IN LESS THAN 1 DAY | | | | | | 6.0 | 49.8 | 50 | 5.2 | |
| Ex. 4 | 1.6 | A | 6.2 | A | 167 | 2.7 | 2.0 | 50.0 | 195 | 9.3 | 30 |
| UNITS | Nwt/cm | | Nwt/cm | | Hrs | Nwt/cm | AM400 | PERC | mPas | pH | Days |

Example 5

Example 5-A evaluates the tetrahydrofuran (THF) solubility of a water-based pressure sensitive adhesive that is part of the present invention.

99 grams of PD-2075-G, which is an aqueous polyacrylic dispersion from H.B. Fuller Company (St Paul, Minn.), was blended with 1 gram of Astromel-400®. The water-based pressure sensitive adhesive was aged at ambient room temperature for 30-days. The aged sample had a tetrahydrofran solubility of 62%.

Example 5-B evaluates the tetrahydrofuran solubility of a water-based pressure sensitive adhesive that is not part of the present invention.

Example 5-B was run exactly as described in example 5-A with the exception that the Melamine-formaldehyde resin (Astromel-400®) was excluded. The water-based pressure sensitive adhesive has a THF solubility of 77.6%.

The data indicate that Example 5-A has decreased solubility in THF compared to example 5-B, thus showing some degree of crosslinking has occurred.

The above examples have been depicted solely for the purpose of exemplification and are not intended to restrict the scope or embodiments of the invention. The invention is further illustrated with reference to the claims that follow thereto.

What is claimed is:

1. A water-based pressure sensitive adhesive comprising:
   a) at least one water-based polyacrylic polymer having a glass transition temperature ($T_g$) of from about −80° C. to about −20° C.
   b) at least one aminoplast resin present in an amount ranging from about 0.2% by weight to about 8% by weight based on total solids, wherein said adhesive exhibits a shear strength of greater than about 10 hours.

2. The adhesive according to claim 1, wherein the aminoplast resin is selected from the group consisting of melamine-formaldehyde resin, urea-formaldehyde resin, alkylated melamine-formaldehyde resin, partially alkylated melamine-formaldehyde resin and combinations thereof.

3. The adhesive according to claim 1, wherein said water-based polyacrylic polymer is selected from the group consisting of styrene-acrylic copolymer, vinyl-acrylic, vinyl ester/vinyl acetate/acrylic, ethylene vinyl acetate polymers and combinations thereof.

4. The adhesive according to claim 1, further comprising the hydroxide ion of ammonia.

5. The adhesives according to claim 1, wherein said water-based polyacrylic polymer has a glass transition temperature in a range from about −40° C. to about −65° C.

6. The adhesive according to claim 1, wherein said water-based polyacrylic polymer has a polydispersity in a range of from about 3 to about 1.

7. The adhesive according to claim 1, wherein said water-based polyacrylic polymer has a weight average molecular weight of less than about 100,000 grams/mole to about 200,000 drams/mole.

8. The adhesive according to claim 2, wherein said aminoplastic resin is a partially alkylated melamine-formaldehyde resin.

9. The adhesive according to claim 1, wherein the adhesive has a loop tack greater than about 3 newtons/cm and a peel strength of greater than about 5 newtons/cm.

10. A water-based pressure sensitive adhesive comprising:
    a) at least one aqueous polyacrylic dispersion having a glass transition temperature of from about −80° C. to about −20° C. and present in an amount ranging from about 90% by weight to about 99.8% by weight based on total solids; and
    b) at least one melamine formaldehyde resin present in an amount ranging from about 0.2% by weight to about 8% by weight based on total solids, wherein said adhesive exhibits a shear strength of greater than about 10 hours.

11. The water-based pressure sensitive adhesive according to claim 1 comprising: at least one water-based polyacrylic polymer comprising at least one ethylenically unsaturated monomer selected from the group consisting of acrylic acid, methacrylic acid, linear and branched $C_1$ to $C_{20}$ (meth)acrylic ester, hydroxyfunctional (meth)acrylates, acrylamide and methacrylamide, N-methylol acrylamide, N-methylolmethacrylamide, acrylonitrile, methacrylonitrile, fumaric acid, amino acrylates, styrene, vinyl ethers, vinyl acetate, vinyl esters, vinyl and vinylidene halides, N-vinyl pyrrolidone, ethylene, $C_3$ or greater -olefins, allyl amines, allyl esters of saturated monocarboxylic acids and amides thereof, propylene, 1-butene, 1-pentene, 1-hexene, 1-decene, allyl amines, allyl acetate, allyl propionate, allyl lactate, their amides, mixtures thereof, 1,3 butadiene, 1,4, butadiene, 1,3 pentadiene, 1,4 pentadiene, cyclopentadiene, hexadiene isomers and mixtures thereof.

12. The water-based pressure sensitive adhesive according to claim 10, said adhesive exhibiting a loop tack of greater than about 3 newtons/cm, a peel strength of greater than about 5 newtons/cm.

13. The water-based pressure sensitive adhesive according to claim 10, wherein said polyacrylic dispersion has a glass transition temperature of from about −70° C. to about −30° C.

14. The water-based pressure sensitive adhesive according to claim 13, wherein said polyacrylic dispersion has a glass transition temperature of from about −65° C. to about −40° C.

15. The water-based pressure sensitive adhesive according to claim 10, wherein said polyacrylic dispersion is selected from the group consisting of styrene-acrylic, vinyl-acrylic, vinyl ester/vinyl acetate/acrylic, ethylene vinyl acetate polymers and combinations thereof.

16. The water-based pressure sensitive adhesive according to claim 10, wherein said polyacrylic dispersion has a weight average molecular weight of from about 100,000 to about 300,000.

17. The water-based pressure sensitive adhesive according to claim 1, wherein said polyacrylic dispersion has a weight average molecular weight of from about 100,000 to about 200,000.

18. The water-based pressure sensitive adhesive according to claim 1, wherein said water-based polyacrylic polymer is present in an amount of from about 90 wt % to about 99.8 wt %.

19. The water-based pressure sensitive adhesive according to claim 1, wherein said adhesive further comprises a polymer dispersion selected from the group consisting of polyurethane, polyurethane-acrylic hybrids, polyamides, styrene-butadiene rubber, polychoroprenes, acrylonitrile-butadiene-styrene, polyisoprene, polyisobutylene, polyurea, natural latex, polysaccharides, gum resins and combinations thereof.

20. The water-based pressure sensitive adhesive according to claim 10, wherein said adhesive further comprises a polymer dispersion selected from the group consisting of polyurethane, polyurethane-acrylic hybrids, polyamides, styrene-butadiene rubber, polychoroprenes, acrylonitrile-butadiene-styrene, polyisoprene, polyisobutylene, polyurea, natural latex, polysaccharides, gum resins and combinations thereof.

* * * * *